United States Patent [19]

Chuang

[11] Patent Number: 6,044,508
[45] Date of Patent: Apr. 4, 2000

[54] TIRE REPAIR TOOL ASSEMBLIES CONTAINING TIRE CEMENT

[76] Inventor: Louis Chuang, P.O. Box 63-247, Taichung, Taiwan

[21] Appl. No.: 09/097,796

[22] Filed: Jun. 16, 1998

[51] Int. Cl.[7] .................................................. B25B 13/00
[52] U.S. Cl. .............................. 7/138; 157/1.3; 81/15.6; 81/15.7; 7/166
[58] Field of Search .............................. 7/138, 166, 170; 157/1.3; 81/15.5, 15.6

[56] References Cited

U.S. PATENT DOCUMENTS

| 2,928,300 | 3/1960 | Rodgers | 81/15.6 |
| 5,632,056 | 5/1997 | Hsiao | 7/138 |
| 5,711,042 | 1/1998 | Chuang | 7/138 |
| 5,715,554 | 2/1998 | Downs et al. | 7/137 |

*Primary Examiner*—James G. Smith
*Attorney, Agent, or Firm*—Charles E. Baxley, Esq.

[57] ABSTRACT

A tire repair tool includes a compartment (13; 51) for containing tire cement (15; 54, 56) therein, and a cap (14; 17) removably connected to the tire repair tool for housing the tire cement.

4 Claims, 12 Drawing Sheets

TIRE REPAIR TOOL ASSEMBLIES CONTAINING TIRE CEMENT

BACKGROUND OF THE INVENTION

The present invention relates to tire repair tool assemblies containing tire cement therein to provide a convenient repair device for bicycles.

When a cyclist has a flat tire in an area where repair shops are not available, he/she often has to leave the bicycle on the site or load it on a vehicle. The present invention is intended to provide tire repair tool assemblies that allow the cyclists to repair the flat tire on the site.

SUMMARY OF THE INVENTION

The present invention provides a tire repair tool that includes a compartment for containing tire cement therein, and a cap is removably connected to the tire repair tool for housing the tire cement.

The present invention also provides a tire repair tool assembly that includes a first tool member and a second tool member detachably engaged with the first tool member. The first tool member includes a compartment defined therein for containing tire cement therein. A cap is removably connected to the first tool member for housing the tire cement.

In a preferred embodiment of the invention, the cap includes a groove defined in an upper side thereof, and the first tool member includes a first hooked end for engaging with the groove for detaching the cap from the first tool member.

In another preferred embodiment of the invention, the second tool member includes a plurality of positioning grooves defined in an underside thereof for retaining a plurality of tools in position. The second tool member further includes at least one polygonal slot defined in at least one of two ends thereof so as to be used as a wrench. The first tool member includes a polygonal recess defined in an underside thereof.

Other objects, advantages, and novel features of the invention will become more apparent from the following detailed description when taken in conjunction with the accompanying drawings.

DESCRIPTION OF THE PREFERRED EMBODIMENT

Figure 1:
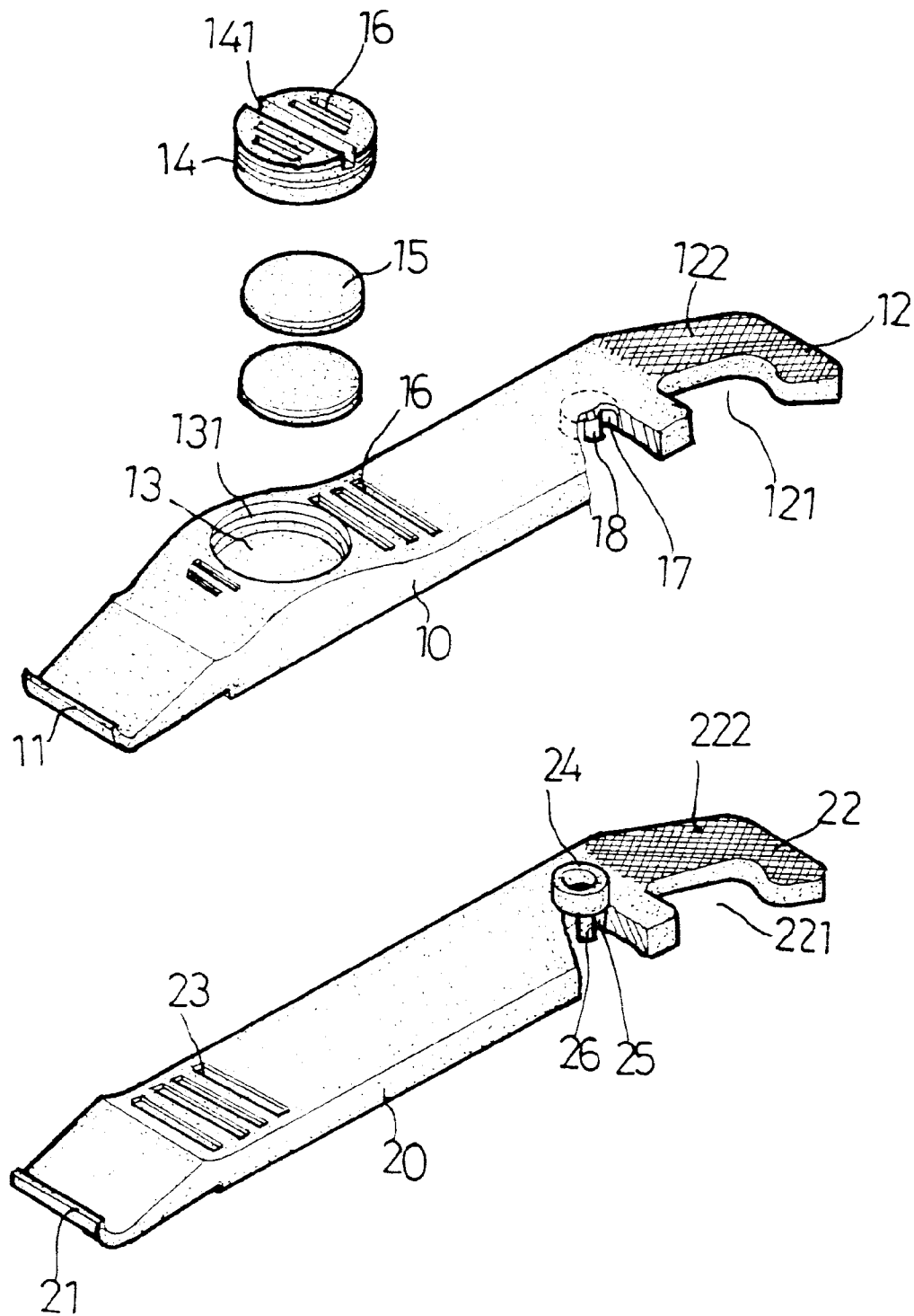
FIG. 1 is an exploded perspective view of a first embodiment of a tire repair tool assembly in accordance with the present invention.
Figure 2:
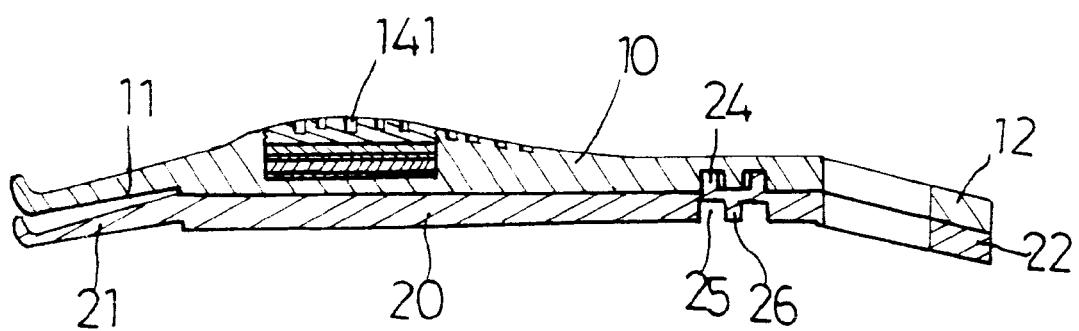
FIG. 2 is a sectional view of the tire repair tool assembly in FIG. 1.
Figure 3:
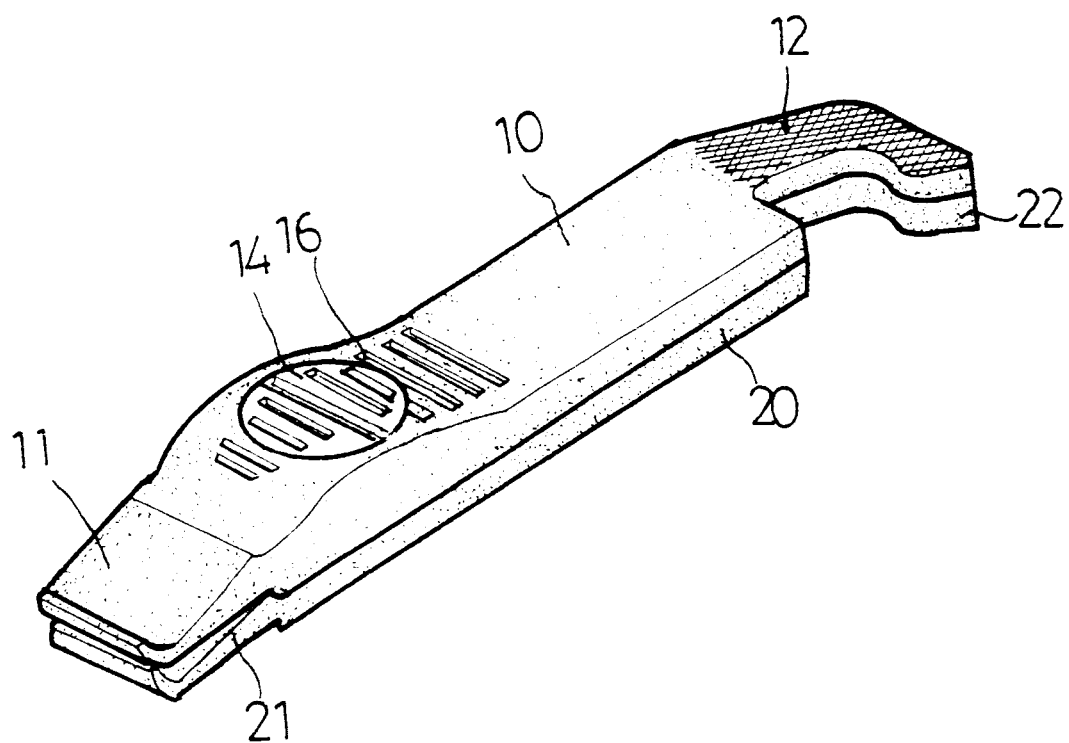
FIG. 3 is a perspective view of the tire repair tool assembly in FIG. 1.

FIGS. 1 to 3 show a first embodiment of a tire repair tool assembly in accordance with the present invention. The tire repair tool assembly includes a first tool member 10 and a second tool member 20 detachably engaged with the first tool member 10. Each tool member 10, 20 includes a first hooked end 11, 21 and a second engaging end 12, 22. The second engaging end 12, 22 includes a notch 121, 221 defined in a side thereof and a knurled upper side 122, 222 to provide increased friction for easy grasp. Each tool member 10, 20 further includes a round recess 17, 25 defined in an underside thereof, and a peg 18, 26 is formed in a center of a bottom wall (not labeled) of the round recess 17, 25. Further, a round protrusion 24 having a round recess (not labeled) is formed on the upper side of the second tool 20. The first tool 10 further includes a compartment 13 defined in the upper side thereof for receiving tire cement 15 therein, and a cap 14 is removably engaged with a threading 131 defined in a periphery defining the compartment 13 to house the tire cement 15. The cap 14 may include a groove 141 defined in an upper side thereof. Further, anti-slide grooves 16 may be provided on the upper side of the cap 14 and the upper side of the first tool 10.

Figure 4:
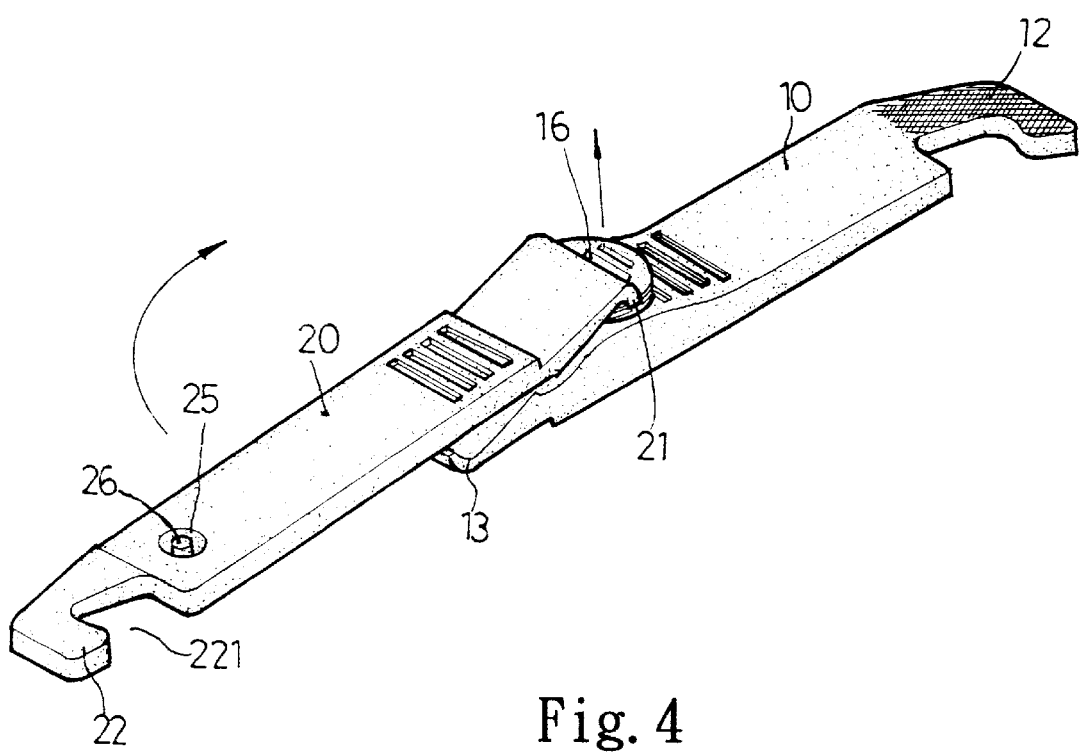
FIG. 4 is a perspective view illustrating removal of a cap for acquiring tire cement.

In assembly, the tire cement 15 is housed in the compartment 13, and the round protrusion 24 of the second tool 20 is engaged with the round recess 17 of the second tool 10, best shown in FIG. 2. As shown in FIG. 4, the hooked end 21 of the second tool member 20 (which has been disengaged from the first tool member 10) is engaged with the groove 141 of the cap 14 for acquiring the tire cement 15 after removing the cap 14.

Figure 5:
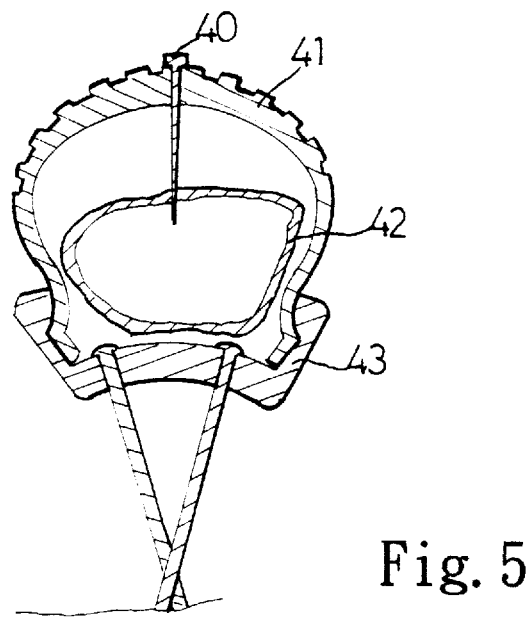
FIGS. 5 to 7 are sectional views illustrating tire repair.
Figure 6:
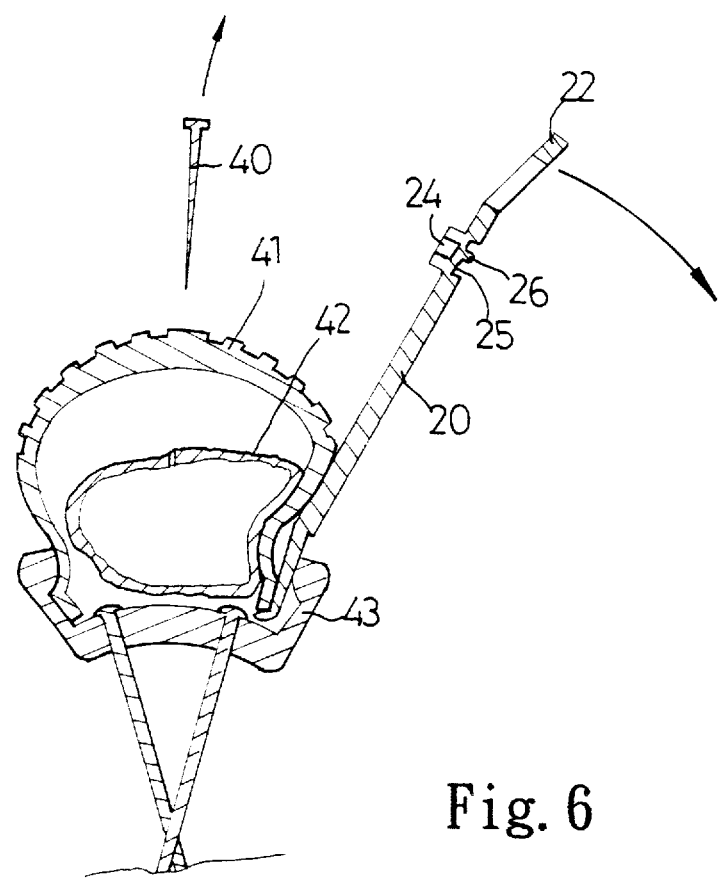
Figure 7:
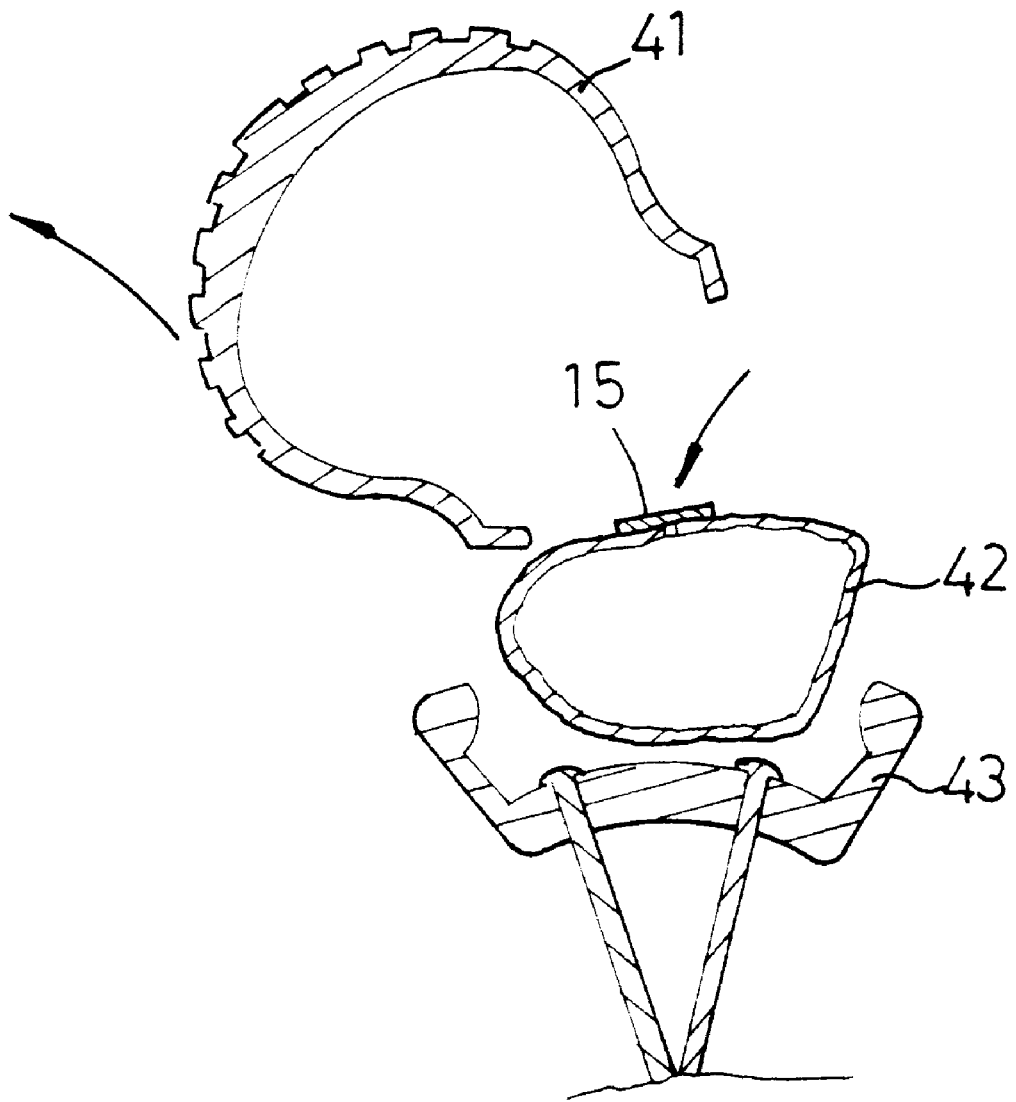

In use, for repairing a flat tire shown in FIG. 5, the nail 40 is firstly removed (FIG. 6), and the second tool member 20 (or the first tool member 10) is inserted into the wheel rim 43 for detaching the outer tire 41 from the wheel rim 43. Then, the user may use the tire cement 15 to cover the hole (not labeled) in the inner tire 42 caused by the nail 40.

Figure 8:
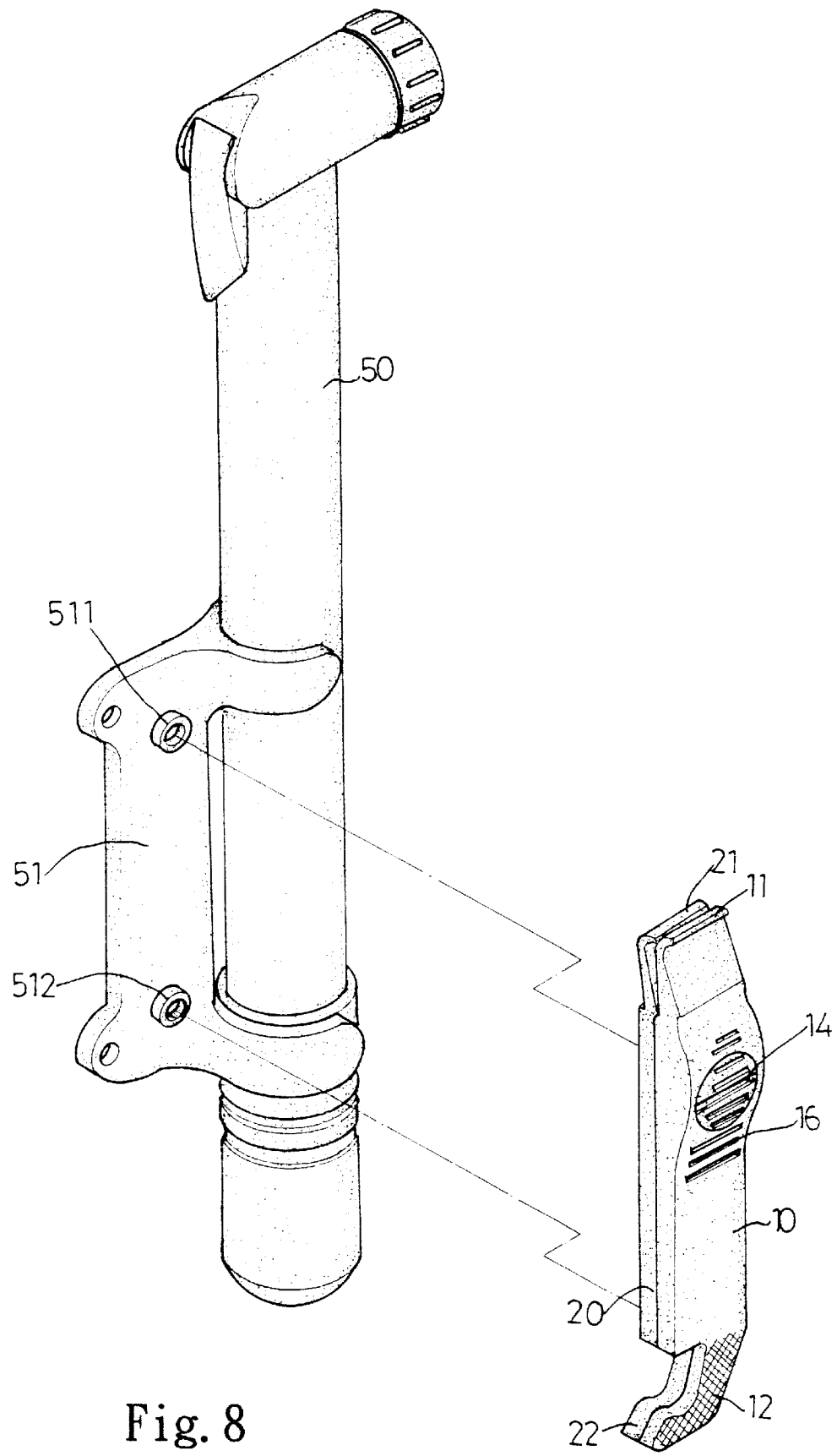
FIG. 8 is an exploded perspective view illustrating a modified embodiment of the tire repair tool assembly in accordance with the present invention attached to a hand air pump.
Figure 10:
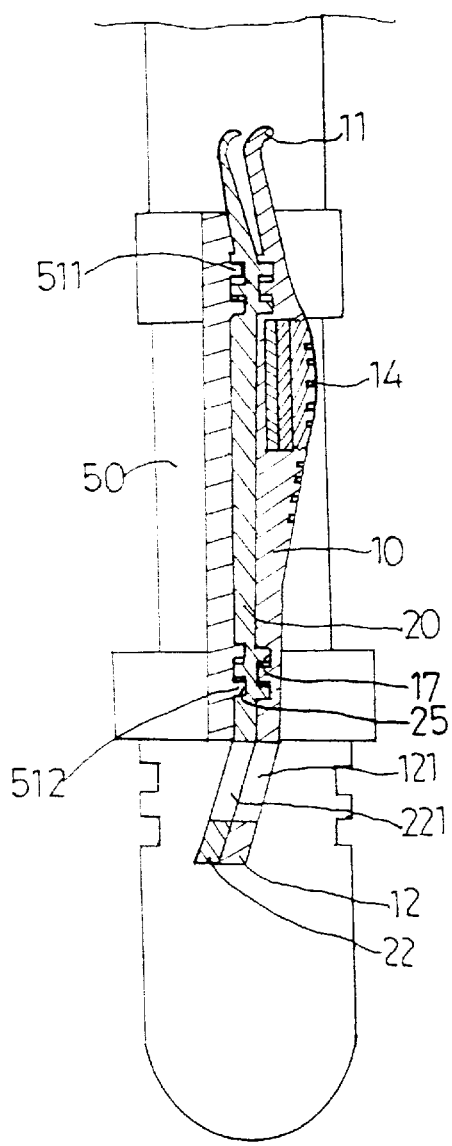
FIG. 10 is a sectional view taken along plane X—X in FIG. 9.
Figure 9:
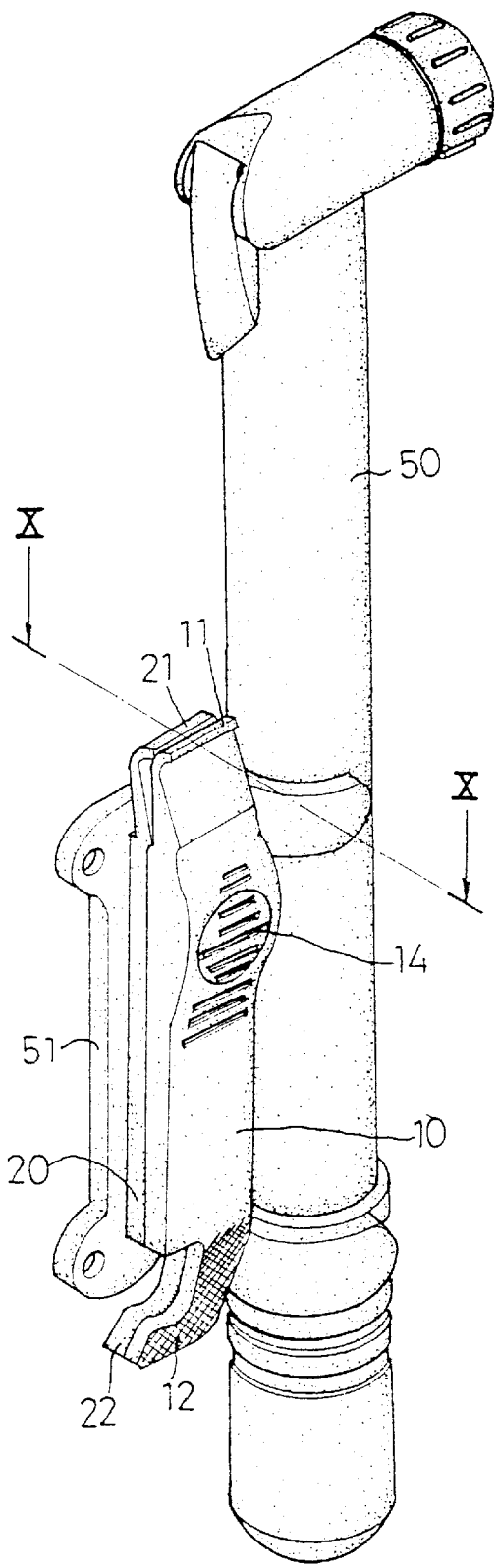
FIG. 9 is a perspective view of the tire repair tool assembly and the hand air pump.
Figure 11:
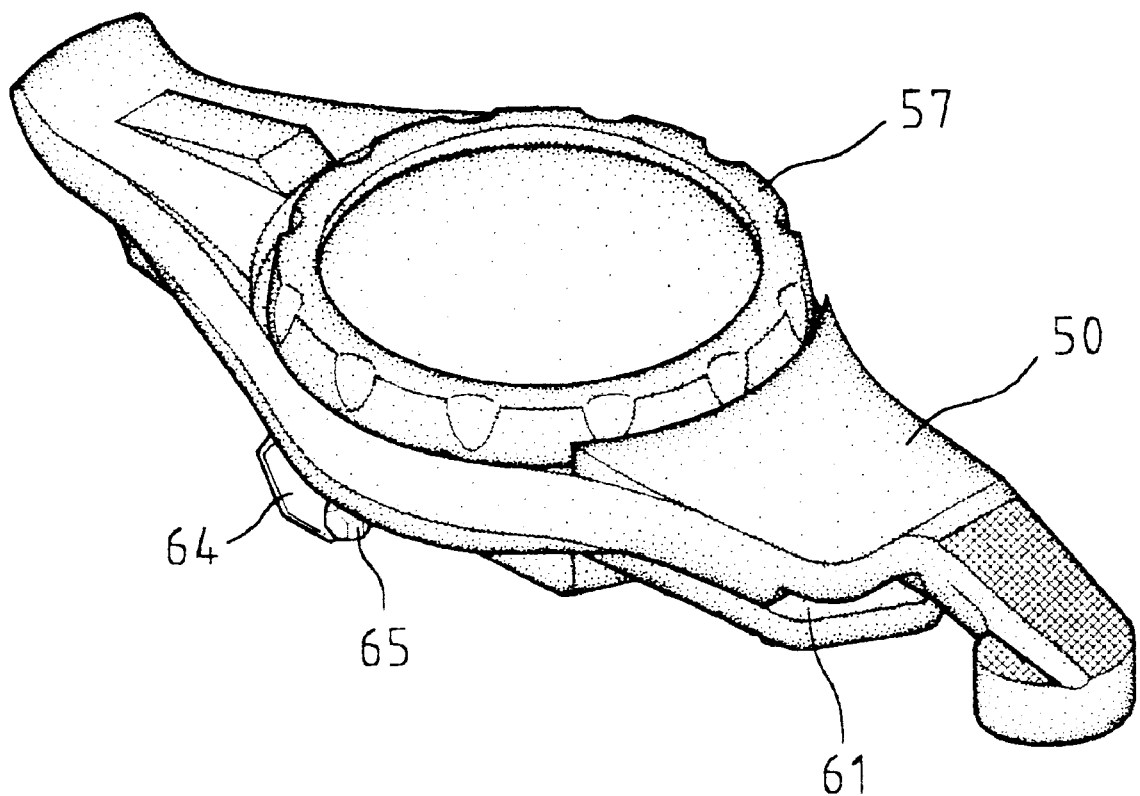
FIG. 11 is a perspective view of a second embodiment of the tire repair tool assembly in accordance with the present invention.
Figure 12:
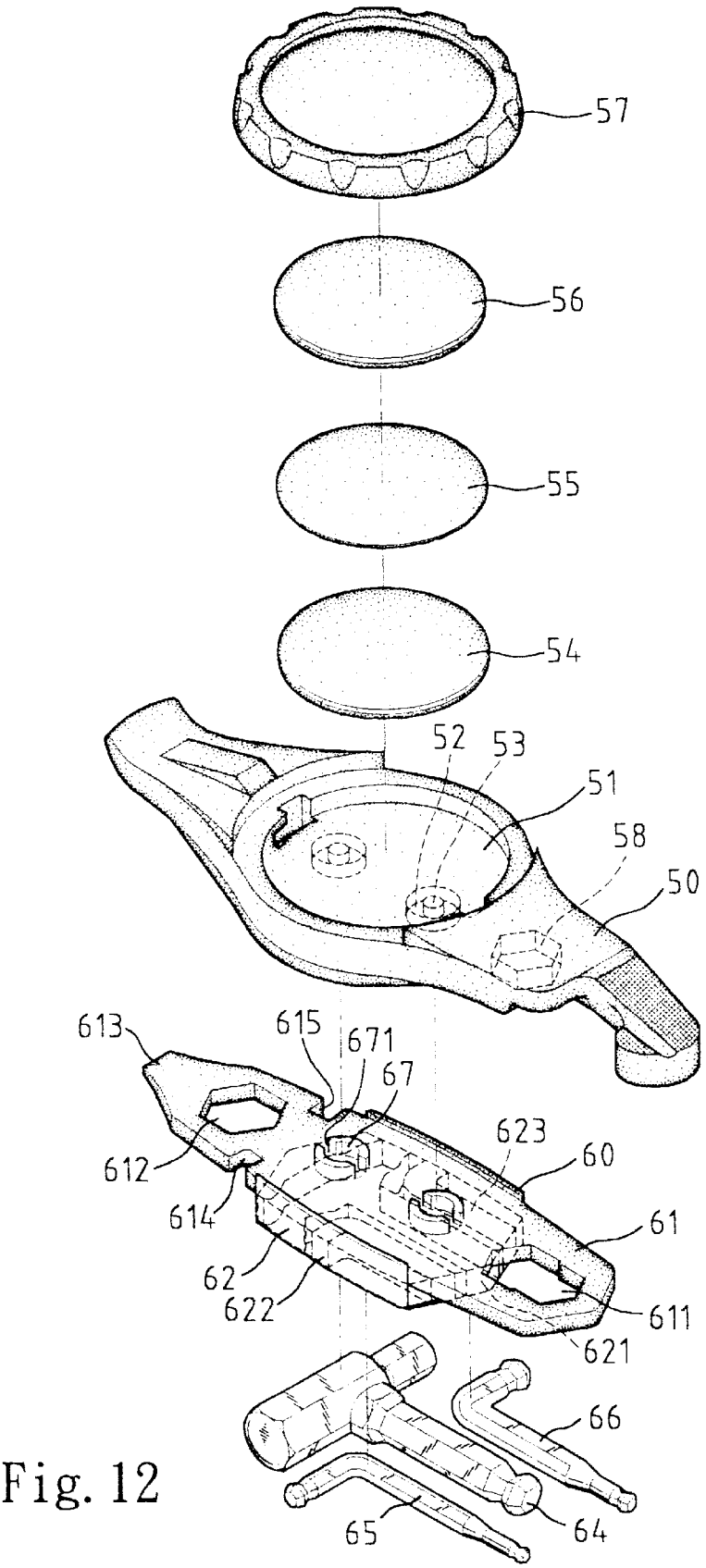
FIG. 12 is an exploded perspective view of the tire repair tool in FIG. 11.
Figure 13:
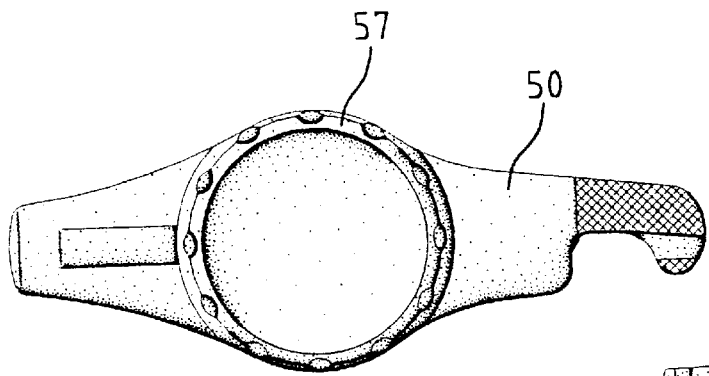
FIG. 13 is a top view of the tire repair tool assembly in FIG. 11.
Figure 16:
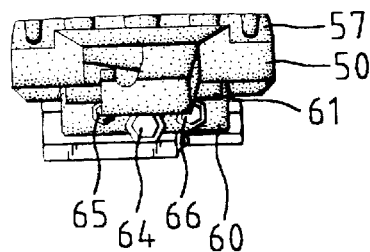
FIG. 16 is a side view of the tire repair tool assembly in FIG. 11.
Figure 14:
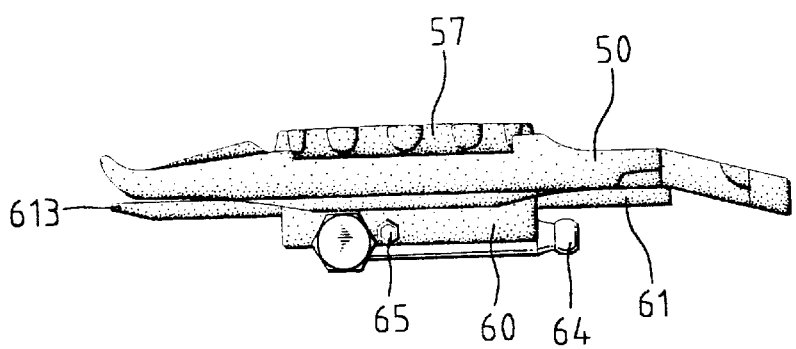
FIG. 14 is a front view of the tire repair tool assembly in FIG. 11.
Figure 15:
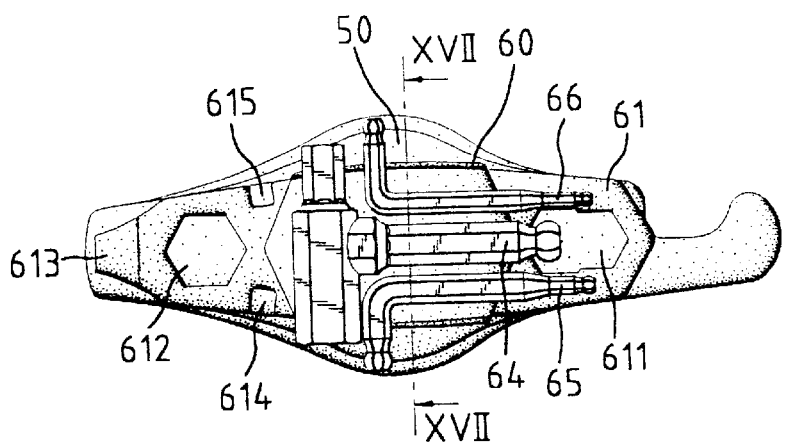
FIG. 15 is a bottom view of the tire repair tool assembly in FIG. 11.
Figure 17:
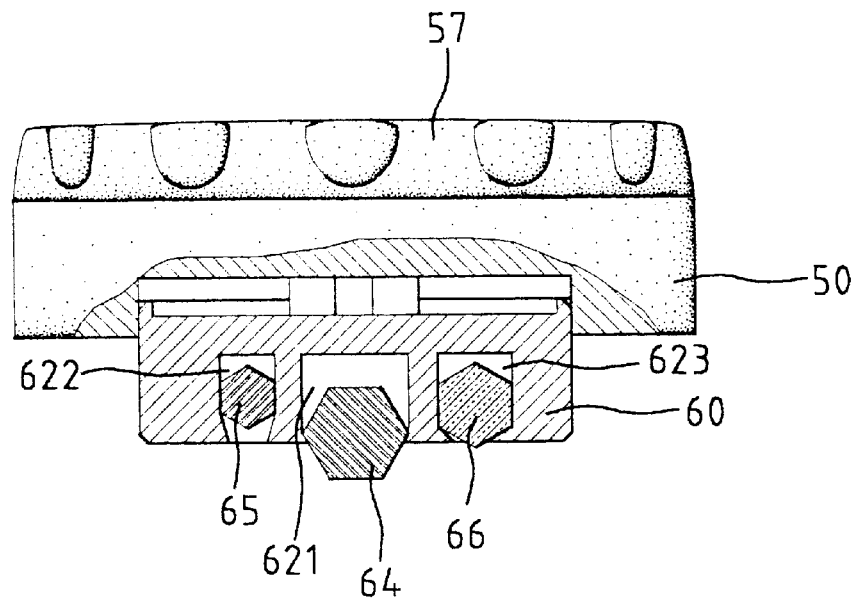
FIG. 17 is a sectional view taken along plane XVII—XVII in FIG. 15.

FIGS. 8 to 10 illustrate a modified embodiment, wherein each of the first and second tool members 10 and 20 includes two round recesses 17, 25 defined in the underside thereof so as to be respectively, removably engaged with two holed round protrusions 511 and 512 on a mounting frame 51 securely attached to a hand air pump 50. This may solve the carriage problem of the tire tool assembly.

Turning to FIGS. 11 to 17 which show a second embodiment of the tire repair tool assembly in accordance with the present invention. The tool assembly includes a first tool member 50 and a second tool member 60. The first tool member 50 includes two round recesses 52 defined in an underside thereof, each round recess 52 having a peg 53 formed on a center of a bottom wall thereof. The second tool member 60 includes two holed protrusions 67 formed on an upper side thereof for removably receiving the pegs 53. Each holed protrusion 67 includes a diametrical slit 671 to allow slight expansion of the protrusion 67.

The first member 50 further includes a compartment 51 defined in an upper side thereof for receiving tire cement 54 and 56 therein. A sandpaper 55 may also be received in the compartment 51, and a cap 57 is provided to house the tire cement 54 and 56 and the sand paper 55. The first member 50 further includes a hexagonal recess 58 defined in the underside thereof which allows the first tool member 50 to be used as a wrench.

Figure 18:
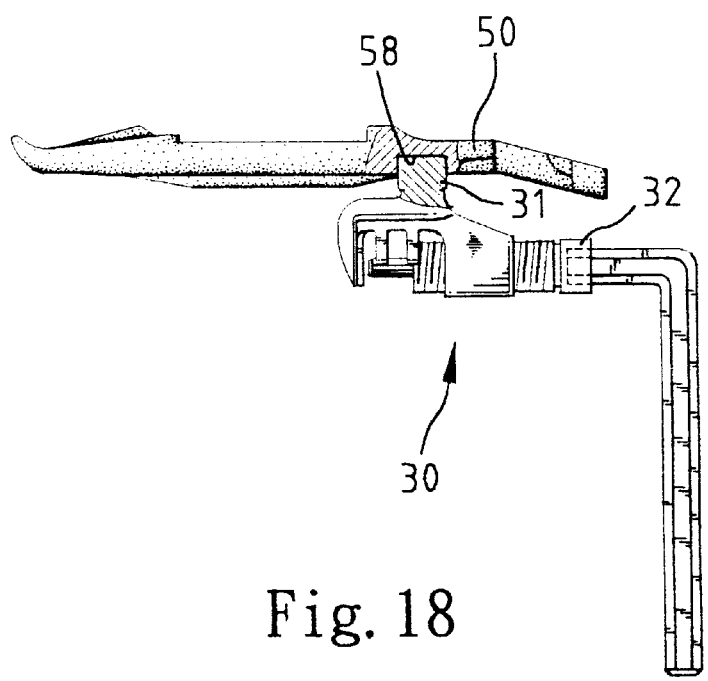
FIG. 18 is a side view illustrating combination of the tire repair tool assembly and a chain wrench.

The second tool member 60 includes a main body 61 having a first end in which a polygonal slot 611 is defined and a second end in which another polygonal slot 612 is defined. The second end of the main body 61 further includes a tip 613 in the form of a screwdriver head (a cabinet tip in this embodiment). The slots 612 allows the second tool member 60 to be used as a wrench. The second tool member 60 may further include a holding seat 62 which has a number of positioning grooves 621, 622, 623 defined in an underside thereof for retaining various small tools (e.g., small L-shaped hexagonal wrenches 65 and 66 and T-shaped hexagonal wrench 64) in position. In this embodiment, embedding and molding form the holding seat 62 and the main body 61 of metal together. The second end of the main body 61 may further include a pair of notches 614 and 615 defined in two lateral sides thereof, respectively. The tool assembly of this embodiment allows the user to operate the tool members 50 and 60 as wrenches, which may be useful for repair. Referring to FIG. 18, the recess 58 of the first tool 50 may be engaged with a part 31 of a chain wrench such that the user may rotate a sleeve 32 to tighten/loosen the chain of the bicycle when desired.

According to the above description, it is appreciated that the tire repair tool assembly is useful for repairing flat tires, which is extremely advantageous if the flat tire is happened in a wild area or an area where repair shops are not available.

Although the invention has been explained in relation to its preferred embodiment, it is to be understood that many other possible modifications and variations can be made without departing from the spirit and scope of the invention as hereinafter claimed.

What is claimed is:

1. A tire repair tool assembly, including a first tool member and a second tool member detachably engaged with the first tool member, the first tool member including a compartment defined therein for containing tire cement therein, and a cap removably connected to the first tool member for housing the tire cement, wherein the cap includes a groove defined in an upper side thereof, and the second tool member includes a hooked end for engaging with the groove for detaching the cap from the first tool member.

2. A tire repair tool assembly, including a first tool member and a second tool member detachably engaged with the first tool member, the first tool member including a compartment defined therein for containing tire cement therein, and a cap removably connected to the first tool member for housing the tire cement, wherein the second tool member includes a plurality of positioning grooves defined in an underside thereof for retaining a plurality of tools in position.

3. A tire repair tool assembly, including a first tool member and a second tool member detachably engaged with the first tool member, the first tool member including a compartment defined therein for containing tire cement therein, and a cap removably connected to the first tool member for housing the tire cement, wherein the second tool member includes at least one polygonal slot defined in at least one of two ends thereof.

4. A tire repair tool assembly, including a first tool member and a second tool member detachably engaged with the first tool member, the first tool member including a compartment defined therein for containing tire cement therein, and a cap removably connected to the first tool member for housing the tire cement, wherein the first tool member includes a polygonal recess defined in an underside thereof.

* * * * *